Oct. 15, 1968 L. A. STROMMEN 3,406,256

COIN TELEPHONE EMERGENCY SERVICE

Filed June 2, 1965

2 Sheets-Sheet 1

INVENTOR
L. A. STROMMEN
BY E. J. Olinder
ATTORNEY

Oct. 15, 1968 L. A. STROMMEN 3,406,256

COIN TELEPHONE EMERGENCY SERVICE

Filed June 2, 1965 2 Sheets-Sheet 2

United States Patent Office 3,406,256
Patented Oct. 15, 1968

3,406,256
COIN TELEPHONE EMERGENCY SERVICE

Lawrence A. Strommen, Indianapolis, Ind., assignor to Bell Telephone Laboratories, Incorporated, New York, N.Y., a corporation of New York Filed June 2, 1965, Ser. No. 460,716
15 Claims. (Cl. 179—6.3)

ABSTRACT OF THE DISCLOSURE

A coin telephone system for providing coin free access to an emergency operator employing a tone generator and special switching contacts associated with either a rotary or pushbutton dialing mechanism for bypassing coin control circuitry and enabling the tone generator.

Figure 1:
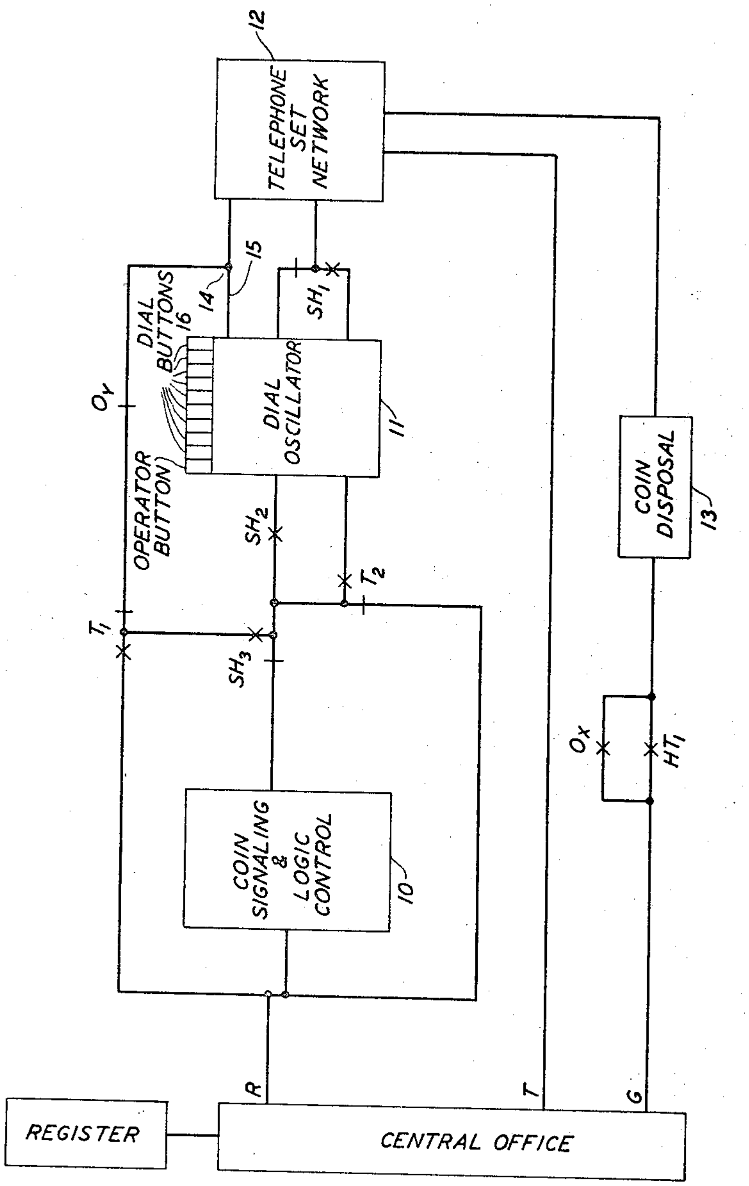

This invention relates to coin telephone systems and more particularly to a system for coin-free emergency access to an operator which does not compromise the system's normal safeguards against fraud.

A system of coin-free operator access from a telephone pay-station can serve several important purposes as, for example, summoning of aid in an emergency when the distressed person does not have the required coinage for deposit. The value of such a service has long been recognized, but cost and technical complexities heretofore have impeded its development. One general problem in devising a workable emergency service relates to the fact that most coin telephone systems are designed to withhold all service until the customer deposits coins equal to the local initial rate. This prepay system is employed because, among other reasons, it is considerably less susceptible to a variety of fraud techniques, it reduces frivolous use of the telephone and achieves a higher collection ratio. Coin-free access systems of the prior art have either seriously compromised this performance in one or more respects, or have been prohibitively expensive.

The main difficulty in adding emergency coin-free operator service to existing circuits lies in rendering it impossible for any number to be reached through the service other than that of the emergency operator. In most prepay coin telephone systems each station is monitored by a central office with an electric potential applied between the conventional ring and ground connections. This path normally is completed upon receipt of an initial coin deposit. The ensuing flow of current is recognized by the central office as a start request and dialing current is provided to the station. In more advanced systems, such as that described in the copending patent application of A. Busala, R. R. Stokes and L. A. Strommen, Ser. No. 454,889, filed May 11, 1965, the dial also is electrically disabled until coins equal to the local initial rate have been deposited. Coin-free access, therefore, entails bypassing these safeguards to acquire dialing current, and to enable the dial for the sole purpose of calling an emergency operator.

This mode of operation is hard to achieve with most rotary dial systems, because in order to dial the operator digit, the rotary dial must pulse through its entire range of ten pulses. In order for the central office to receive these ten pulses, the pulse path to the central office must be open for the entire duration of the dialing. The register in the central office usually recognizes dialing information as individual pulse trains numbering one to ten pulses. It is possible in such a system to cause this equipment to respond to some number other than the operator digit dialed, by interrupting the return of the dial after from one to nine pulses have been transmitted. To avoid exposure to this type of fraud, devices may be added to preclude interruptions of the dial pulsing, as, for example, described in Patent 3,046,655, issued to P. G. Cath et al. on July 24, 1964. This and similar mechanisms are costly, however. Furthermore, in essence, these represent accommodations to an established signaling system based upon dial pulsings, and as such are subject to all the limitations thereof.

Accordingly, an object of the invention is to lessen the instances of hardship arising when no coins are available to initiate a pay-station call to report an emergency condition.

Another object of the invention is to connect a coin station user to an emergency operator through normal circuits without prior coin deposit, while preventing any other connection.

A further object of the invention is to reduce the cost of coin telephone station emergency operator service to a level of economic feasibility.

These and other objects are achieved in accordance with the principles of the invention by dial apparatus responsive only to the dialing of a selected digit for momentarily acquiring a normal central office connection and momentarily enabling the dial, and a tone generator which produces concurrently with the enabling of the dial a unique tone identifying the selected digit and means for transmitting the tone to the central office to signify an emergency service request. Advantageously, the digit selected may be the "operator" digit and the unique identifying tone may be comprised of two concurrently-generated audio signals of distinctly different frequencies, continuously produced whenever the dial is momentarily enabled.

The invention is particularly adaptable to multifrequency signaling systems in which each digit is signified by a unique tone generated at the pay-station and transmitted to the central office register in place of more conventional dial pulse trains. In a typical such system a flow of current from ring to ground signals a service request to the central office. The dial, which includes a multifrequency tone generator typically an oscillator, is shorted or disabled until an initial rate is deposited. In this system, in accordance with the invention, emergency service involves adding contact means or other suitable apparatus which is responsive only to the dialing of the operator digit, and which operates only after the operator tone-generating dial contacts are closed. Concurrently, the added contact means opens the dial shorting path and closes a bypass around a contact that keeps the ring-ground circuit open until at least one coin is deposited.

In accordance with the invention, whenever the operator button is dialed or depressed and the telephone handset is "off-hook" with no coins deposited, the normally open ring-ground path is closed, the normally disabled dial is enabled and a tone signifying the operator digit is generated and transmitted to the central office. The central office register is typically designed to receive multifrequency tones and translate these into digit information. The received tone is recognized as an operator request and the call is routed accordingly.

Pursuant to another aspect of the invention, the frequency-producing contacts are closed the full time that the dialing circuit is closed; and advantageously may be made to open before and close after the corresponding operations in the dialing circuit. In the interval when the dialing circuit is completed, the operator tone is transmitted continuously to the central office. Since no unused portion of the transmit time exists, no signal of any kind can appear by itself in this interval except, of course, the operator's signal. Moreover, the register is equipped to reject all signals but the one or more selected combinations of different digit-denoting tones generated one combination at a time at the pay-station. Therefore, neither the introduction of tones surreptitiously generated from without, nor the dialing of other digits beside the operator digit will result in any telephone connection whatsoever. The fraud-preventive capability of this aspect of the invention is self-evident.

The inventive principle is also readily applicable to rotary dial systems in which the central office register can accept both dial pulses and tone signals. A suitable oscillator which can generate a unique tone to identify a preselected digit is included in the dial circuit along with added dial contacts. When the operator digit is dialed, these contacts first establish a dialing connection and then for a duration of about one dial pulse during unwind enable the dial and the oscillator. For this duration only, the dialing circuit is open; and for the entirety thereof the unique tones are generated and transmitted to the central office. The duration involved is advantageously the first dial pulse interval that occurs as the dial begins to unwind, but the duration may be longer and some other interval of the unwind may be selected. In any case, in accordance with the invention, the dialing circuit is disabled at all times other than the interval in which the unique tone is transmitted continuously to a central office register.

Accordingly, a feature of the invention relates to a coin telephone emergency service control circuit in which tones instead of dial pulses are applied in timed relation to the establishing of a dial connection to signal an emergency operator.

Another feature of the invention relates to a telephone pay-station having tone signaling capability, in which added dial contacts responsive only to the dialing of the operator digit close the operator tone contacts, unshort the dial and close a normally open path from ring to ground, all without need of coinage deposit.

A further feature of the invention involves a pay-station emergency calling system in which a unique tone signal, generated at the pay-station continuously during a momentary central office connection effected in response to dialing of an operator digit, is employed in conjunction with a compatible central office register to effect a coin-free operator connection and to preclude any other connection.

The principles of the invention and further objects and features thereof are more fully delineated in the following detailed description of two illustrative embodiments.

Figure 2:
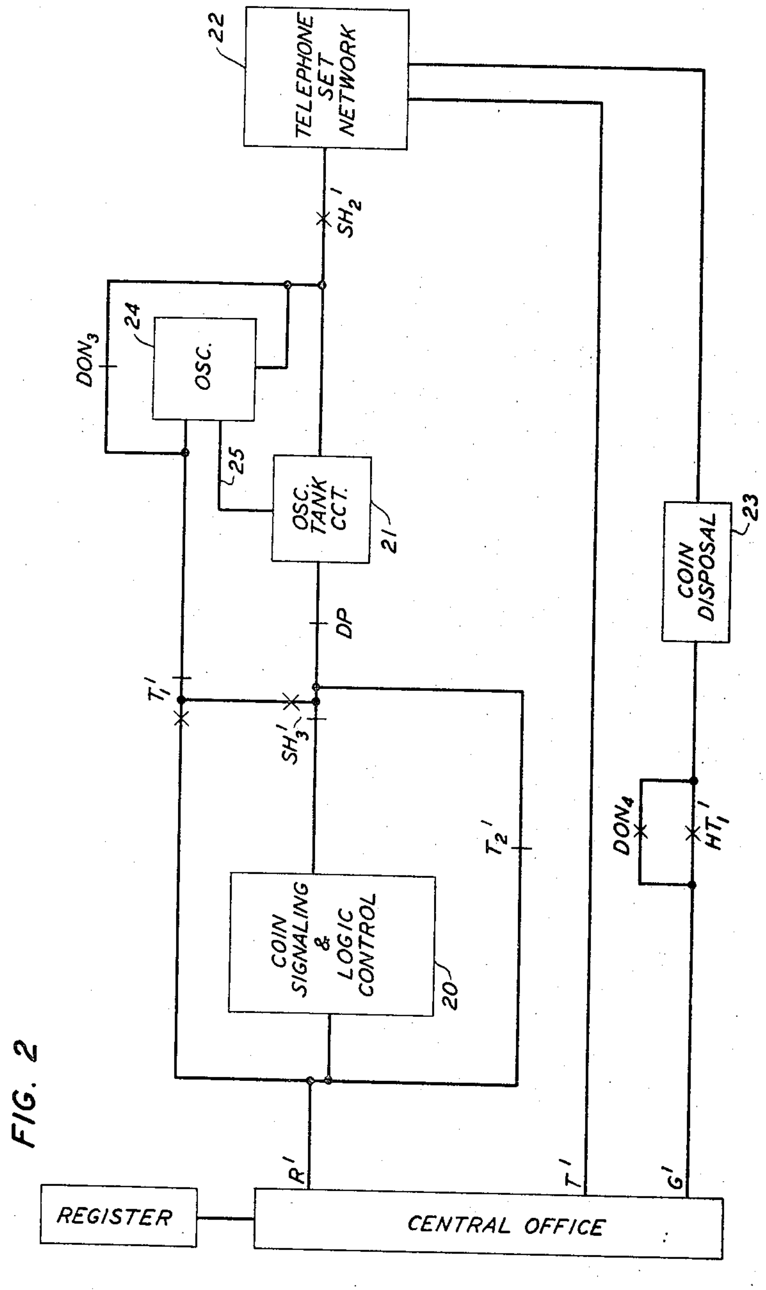

In the drawing:

FIG. 1 is a schematic diagram showing the emergency operator circuit employed in a typical coin telephone station of the tone dialing type; and FIG. 2 is a similar schematic diagram showing the emergency circuit employed in a rotary dial type coin telephone station.

FIG. 1 shows a coin telephone station circuit of an advanced design in which certain of the elements not essential to a full explanation of the invention are designated functionally in block form. Ring and tip leads R and T and ground G represent standard connections of the station with the central office (not shown). A full explanation of this particular station circuit may be found in the cited copending application of A. Busala et al. Block 10 represents the coin signaling and logic control circuitry. Block 11 represents a tone-generating circuit which consists typically of a transistor oscillator and a network. An associated plurality of dial buttons 16, usually ten in number including an operator button, actuate corresponding contacts within oscillator 11. A dial similar to this is described in the copending application of J. H. Ham, Jr., W. E. Hostetler, J. F. Ritchey and W. R. Tolman, Ser. No. 291,770, filed July 1, 1963. Block 12 represents a standard telephone speech network and includes a transmitter and receiver (neither shown). Block 13 represents a coin disposal unit, also described in the cited Busala et al. copending application.

Each tone of dial 11, including the operator tone, is a unique combination of selected audio frequencies, normally two frequencies per tone. A register (not shown), located in the central office and including resonating and filter networks or other standard art techniques, normally receives these tones consecutively sent and converts each into a numerical digit. Any other signals received are rejected as "errors" and no connection would result.

In the description of the novel circuitry to follow, conventional telephone designations are employed to describe various connections. SH1, SH2 and SH3 are all switchhook contacts which transfer when the receiver is removed physically from the switchhook. Contacts T1, T2 and A1 are associated with the logic operation of the circuit. Contact HT1, the hopper trigger contact, operates when the first coin of any denomination is deposited.

In normal standby with the receiver on-hook, the central office applies a D-C potential to the ring connection for monitoring. Since no coin has been deposited, HT1 is open, preventing a ring-to-ground path. The oscillator and dial 11 are disconnected by the combined action of SH1, SH2 and SH3. When the handset is removed from the hook the latter three contacts transfer. The oscillator remains disabled, however, because of a shorting path including SH2 make, SH3 make and T1 break, which short out an active element (not shown) within the oscillator, typically a transistor. If a first coin were deposited, HT1 could close and contact T2 would transfer. Although a path to ground from network 12 would then exist through HT1 oscillator 11 would remain disabled by the aforementioned shorting path. If the first coin were equal in value to the required initial rate, or upon receipt of the next deposited coin, the logic control 10 would cause contact T1 to transfer. This action opens up the disabling path around oscillator 11 and closes a connection through the make side of T1 to terminal R.

In accordance with the present invention, emergency service may be added to the system described above in the following manner. A bypass of HT1 is effected by a path that includes make contact OX. A break contact OY is included in the circuit that normally keeps oscillator 11 shorted until the initial rate is deposited. Contacts OX and OY typically may be conventional wire spring contacts, and are actuated only by the depression of the operator button in dial 16 after the latter has already closed the frequency-controlling contacts (not shown).

Further depressing of the operator button operates contact OY to open the oscillator shorting path. A ring-ground path is effected and includes ring lead R, break contact T2, make contact SH2, oscillator 11, lead 15, speech network 12, coin unit 13, and finally across HT1 via the bypass path including make contact OX, to ground G. The resulting current flow causes a dial connection between R and T to be set up by the central office.

As long as this circuit is complete, the unique tone for the selected digit is transmitted continuously. When the operator button is released, oscillator 11 is again shorted out by the reclosing of contact OY and the ground connection is removed by the re-opening of contact OX. In accordance with the invention, both of the latter operations occur in advance of the re-opening of the mentioned tone contacts. As the transmit time is entirely occupied with the operator tone, no other signal of any kind can appear by itself in that interval. The register will reject any tones that might be generated simultaneously with the operator tone, either inadvertently or otherwise. It is apparent that no tone except that of the operator will result in a telephone connection and, further, that the only possible connection is with the operator.

In accordance with a further aspect of the invention the emergency service control circuit may, with but minor variations, be incorporated into a rotary dial type coin telephone.

FIG. 2 shows diagrammatically an advanced type of coin telephone station circuit in which certain portions thereof which are unessential to a full description of the present invention are designated broadly in block form. A complete description of this circuit is found in Patent 3,170,039, issued to E. R. Andregg et al. on Feb. 16, 1965. A conventional rotary dial includes a dial pulser DP which in normal operation generates pulse trains representing the digits dialed. The contacts SH2′, SH3′, T1′, T2′ and HT1′ all correspond functionally to their respective counterparts in FIG. 1. Dial pulser DP corresponds functionally to dial oscillator 11 of FIG. 1. In the rotary dial application of the invention, a separate oscillator 24 which includes a conventional frequency generating circuit produces at least one tone comprising two different frequencies. Practice of the invention in a rotary dial system necessitates equipping the central office with a register that will process both pulse signals from dial pulser DP, as well as tone signals from oscillator 24.

When the receiver (not shown) is placed off-hook, contacts SH1′, SH2′ and SH3′ change state. A path from ring terminal R′ to contact HT1′ is produced through make contact T2, dial pulser DP, tank 21, make contact SH2′, speech network 22 and coin disposal 23. Ground connection is withheld, by contact HT1′, however, as long as no coins are deposited. With the receiver off-hook and with no coins deposited a shunt path around dial pulser DP exists through make contact SH3′, break contact T1′ and oscillator 24. The latter is shunted by a path that includes a dial off-normal break contact DON3. A shunt path around HT1′ is effected by a second dial off-normal contact DON4.

Tank 21 in series with dial pulser DP and make contact SH2′ provides shock excitation to oscillator 24 as a desirable but not strictly necessary, adjunct to its operation. Tank 21 may be any inductance-capacitance circuit with an undamped LC delay characteristic so that it will oscillate when current through it is removed.

Emergency operator service is initiated by dialing the operator digit of the rotary dial in the usual way. Shortly after the dial is wound off-normal, make contact DON4 closes thereby bypassing the open contact HT1′ and completing the above-described path to ground G′ from ring lead R′. The ensuing flow of monitor current between R′ and G′ is recognized at the central office as a start request. A dialing connection between tip T′ and ring R′ is thereupon set up. In accordance with the invention, when the rotary dial is approximately three-quarters wound, contact DON3 opens and unshunts the path containing dial pulser DP and tank 21. Dialing current thereupon flows in this path, charging the LC circuit of tank 21. At this point, with dial pulser DP still closed, there is sufficient short through tank 21 across oscillator 24 so that the latter will not generate tones. When the dial is fully wound up and commences its unwind, dial pulser DP opens for the first time. Current is now applied to oscillator 24 through the path including SH3′ make and T1′ break. Operator signaling tone is generated and applied to the dialing connection between R′ and T′. The dial pulser DP is normally open for only forty milliseconds per pulse. It is desirable to utilize this entire interval to transmit operator tone to provide a strong signal to the central office and to leave to portion of the interval unused.

If tank 21 were not in the circuit, oscillator 24 would require about ten milliseconds from the time the current is applied to commence its operation. Therefore, it is desirable to shock excite oscillator 24 from some source such as tank 21 when dial pulser DP opens. The discharge current from tank 21 is applied advantageously to the active elements in the oscillator in accordance with standard practice so that the build-up time of the oscillations is substantially reduced. With tank 21 in the circuit, there remains essentially no unused portion of the dial pulser open interval in which extraneous signals from any source might be transmitted.

DON3 closes at about the time that dial pulser DP next closes. In closing, DON3 re-establishes a shorting path around dial pulser DP and oscillator 24. DON3 stays closed for the remainder of the unwind cycle. In this manner, in accordance with the invention, false pulsing of the dial by interruption of the unwind cycle does not avail one seeking a free call, because the dial cannot generate either pulses or tones for the remainder of the cycle. DON4 is allowed to re-open at the point in the unwind cycle at which it originally closed, its function having already been fulfilled.

The tone signal generation need not occur in the first interval that dial pulser DP is open. Instead, contact DON3 may be constructed to open on the second, third, or in fact any, subsequent individual pulse with the resultant enabling of oscillator 24.

Persons skilled in the art may make changes in the arrangements described and it is to be understood that the embodiments shown and described are merely illustrative of the principles of the invention and are not to be construed in a limiting sense.

What is claimed is:

1. In a dial coin telephone signaling system, in combination, means for normally withholding a dialing connection to a central office until deposit of an initial rate, means responsive to dialing of a selected digit for establishing an auxiliary dialing connection to said office, tone generating means, and means responsive to establishing of said auxiliary dialing connection for energizing said tone-generating means and for applying said tone to said auxiliary connection.

2. Dial coin telephone apparatus comprising, in combination, means for withholding a normal dialing connection to a central office until deposit of a first coin, means responsive solely to dialing of a selected digit for establishing an auxiliary dialing connection to said central office and for removing said auxiliary connection after said selected digit is dialed, means for generating a distinct tone, said tone identifying said selected digit, and means responsive to establishing of said auxiliary dialing connection for energizing said tone-generating means and for applying said tone to said connection, said tone being applied throughout the time that said dialing connection is established.

3. Dial coin telephone apparatus comprising, in combination, means for withholding a normal dialing connection between a coin telephone and a central office until deposit of a first coin, means responsive solely to dialing of a selected dial digit for establishing an auxiliary dialing connection to said office and for removing said auxiliary connection after said selected dial digit is dialed, means for generating a distinct multifrequency tone, said tone signifying said selected digit, means responsive to establishing of said auxiliary dialing connection for energizing said tone-generating means and for applying said tone to said connection during at least a portion of the dialing time of said selected digit, and means responsive to receipt of said tone in said central office for effecting a talking connection between said coin telephone and an operator station.

4. Apparatus in accordance with claim 3 wherein said selected digit is the "operator" digit, said multifrequency tone comprises a pair of concurrently-generated audio signals of differing frequencies and said tone is applied continuously to said auxiliary dialing connection throughout the time that said connection is established.

5. In a pre-pay coin telephone signaling system, in combination, dial means including tone-generating means, both of said means normally being disabled until coinage equal to an initial rate is deposited, first means responsive to dialing of a selected digit for establishing a dialing connection to a central office, second means responsive to said dialing of said selected digit for enabling said dial and energizing said tone-generating means, said tone being applied to said dialing connection until dialing of said selected digit is at least partially completed, said second means being further responsive to said partial completion of said dialing for de-energizing said tone-generating means and for disabling said dial means to prevent further dial transmissions.

6. In a pre-pay signaling system between a coin station and a central office, in combination, dial means including means for generating a distinct multifrequency tone, means for withholding a normal dial connection between said telephone and said central office until deposit of a first coin, means for disabling said dial means until deposit of an initial rate, means responsive solely to dialing of a selected digit for enabling said dial means and for disabling said dial means on completion of said dialing of said selected digit, means responsive to said enabling of said dial means for establishing an auxiliary dialing connection to said office and for energizing said tone-generating means, said multifrequency tone being applied to said connection for at least a portion of the time said dial means is enabled, and means responsive to receipt of said tone in said central office for effecting a talking connection between said telephone and an operator station in said office.

7. A signaling system in accordance with claim 6 wherein said selected digit is the "operator" digit, said generated tone comprises a pair of signals of differing frequencies and said tone is applied throughout the time that said dial means is enabled.

8. In a pre-pay coin telephone signaling system including dial means, a control circuit for emergency no-deposit operator signaling comprising, in combination, means for normally withholding a start connection to a central office until deposit of a first coin, dial shorting means for normally disabling said dial means until deposit of an initial rate, means responsive solely to dialing of a selected digit for effecting an auxiliary dialing connection to said central office, means included in said dial means for generating a unique tone corresponding to and identifying said selected digit, means operative concurrently with dialing of said selected digit for unshorting said dial shorting means, thereby to enable said dial and energize said tone generating means, said unique tone being applied to said central office connection, and register means in said central office responsive to receipt of said tone for recognizing same as an operator request.

9. In a pre-pay coin telephone signaling system including dial means, apparatus for emergency no-deposit operator signaling comprising, in combination, means for normally withholding a dialing connection to a central office until deposit of a first coin, dial shorting means for normally disabling said dial means until deposit of an initial rate, first contact means responsive solely to dialing of a selected digit for bypassing said withholding means, thereby to effect an auxiliary dialing connection with said central office, oscillator means included in said dial means for generating a distinct multifrequency tone for uniquely identifying said selected digit, second contact means responsive to dialing of said selected digit for unshorting said dial shorting means, thereby to enable said dial and energize said oscillator means, said second contact means being further responsive to release of said dial means for reshorting said dial means and for de-energizing said oscillator, whereby said tone is transmitted the full time said dial means is enabled, and means responsive to receipt of said distinct tone in said central office for effecting a talking connection between said coin telephone and an operator station.

10. In a pre-pay coin telephone signaling system, in combination, tip, ring and ground connections between a coin telephone station and a central office, dial means including means for generating at least one unique signaling tone, said tone signifying an emergency service request, means responsive to deposit of a first coin for effecting a normal start circuit to said office between said ring and ground connections, means responsive to deposit of an initial rate for normally enabling said dial means, and dial contact means responsive solely to dialing of a selected digit for enabling said tone-generating means and thereafter for enabling said dial means and effecting an auxiliary bridge between said ring and ground leads, thereby to acquire a dialing circuit between said ring and tip leads, said dial contact means being further responsive to completion of dialing of said selected digit for disabling said dial and thereafter for disabling said tone-generating means, said unique tone being transmitted only in the interval said dial is enabled, and said tone being transmitted continuously in said interval.

11. Apparatus in accordance with claim 10 wherein said dialing means comprises an oscillator for generating a plurality of signals of differing frequencies, a plurality of contact means each for effecting generation of a different pair of said frequencies and a plurality of pushbuttons each associated with a respective one of said contact means, one of said pushbuttons being an "operator" button, and said selected digit corresponding to said last-named button.

12. In a coin telephone signaling system including tip and ring leads to a central office, dialing means including means responsive to dialing of an operator digit for generating a unique signaling tone, said tone signifying an operator service request, means responsive to the deposit of a first coin for effecting a start connection between said ring and a ground, and means responsive to deposit of an initial rate for enabling said dialing means, apparatus for effecting a coin-free connection from a coin telephone to said office comprising, in combination, first contact means responsive solely to dialing of said operator digit for effecting a secondary grounding of said ring lead, thereby to acquire an auxiliary dialing connection to said central office, second contact means operative concurrently with said first contact means for initiating generation of said unique tone, third contact means operative after the actuation of said second contact means for enabling said dial means during at least a portion of the dialing time of said digit and for applying said unique tone to said auxiliary connection during said time, and means responsive to receipt of said tone in said central office for effecting a talking connection between said coin telephone and an operator station.

13. In a pre-pay dial coin telephone signaling system, a control circuit for emergency no-deposit operator signaling comprising, in combination, rotary dial means including a dial pulser, said pulser being normally disabled until deposit of an initial rate, first dial contact means responsive solely to dialing of a selected digit for acquiring an auxiliary dialing connection to a central office, oscillator means for generating a distinct multifrequency tone identified with said selected digit, said oscillator means being connected in shunt across said dial pulser, and second dial contact means connected in shunt across said oscillator means, said second contact means being responsive to release of said rotary dial means after winding thereof for unshorting said oscillator, said oscillator means being energized when said dial pulser next opens thereby to apply said distinct tone to said central office connection.

14. In a pre-pay coin telephone signaling system, apparatus for emergency no-depositing signaling of an operator comprising, in combination, rotary dial means including a normally closed dial pulser, said dial means being normally disabled until deposit of an initial rate, means for normally withholding a dialing connection to a central office until deposit of a first coin, first dial contact means responsive to dialing of a selected digit for acquiring an auxiliary dialing connection to a central office, oscillator means for generating a distinct multifrequency tone, said tone identifying said selected digit, said oscillator means being connected in shunt across said dial pulser, register means in said central office responsive to receipt of said tone for connecting said telephone with an operator station, second dial contact means in shunt across said oscillator means and responsive to unwinding of said rotary dial means for unshorting said oscillator means directly before said dial pulser first opens, and for shorting said oscillator means directly after said dial pulser closes, whereby only during the first open interval of said dial pulser, said oscillator means is energized and said distinct tone is transmitted to said central office.

15. Apparatus in accordance with claim 14 wherein said second dial contact means further includes means for unshorting said oscillator means directly before a selected one of the open intervals of said dial pulser, said second dial contact means reshorting said oscillator means directly after said dial pulser next closes, said distinct tone being transmitted only during the selected open interval of said pulser and said rotary dial means being disabled at all other times during winding and unwinding.

No references cited.

KATHLEEN H. CLAFFY, *Primary Examiner.*

D. L. STEWART, *Assistant Examiner.*